United States Patent [19]

Maday

[11] Patent Number: 5,138,994
[45] Date of Patent: Aug. 18, 1992

[54] SUPERCHARGED ROTARY PISTON ENGINE

[76] Inventor: Laszlo Maday, Kleh Istvan u. 2/B, H-1126 Budapest, Hungary

[21] Appl. No.: 580,894

[22] Filed: Sep. 11, 1990

Related U.S. Application Data

[63] Continuation-in-part of Ser. No. 276,049, Jan. 4, 1989, abandoned.

[30] Foreign Application Priority Data

Mar. 25, 1987 [HU] Hungary .................. 1306/87

[51] Int. Cl.$^5$ ............................................. F02B 53/00
[52] U.S. Cl. ............................................. 123/248
[58] Field of Search .................... 123/203, 228, 248

[56] References Cited

U.S. PATENT DOCUMENTS

| | | | |
|---|---|---|---|
| 1,349,111 | 8/1920 | Santos et al. | 123/228 |
| 2,371,514 | 3/1945 | Gold et al. | 123/228 |
| 3,921,597 | 11/1975 | Franco | 123/228 |

FOREIGN PATENT DOCUMENTS

| | | | |
|---|---|---|---|
| 152114 | 6/1904 | Fed. Rep. of Germany | 123/228 |
| 522111 | 3/1921 | France | 123/248 |

*Primary Examiner*—Michael Koczo
*Attorney, Agent, or Firm*—Young & Thompson

[57] ABSTRACT

A supercharged rotary piston engine, which comprises a cylinder (1) with fluid conducting inlet and outlet channels (15, 16); an inner chamber (2) of the cylinder being ring-shaped. The inner chamber includes a supercharging section (10), a working stroke section (11) and an exhaust section (12). A main shaft (5) is rotatably positioned in the cylinder, and a rotary piston (3) in the inner chamber (2) is mounted coaxially with the main shaft (5) and is connected to and rotatable together with the main shaft (5) for driving the shaft. At least one stop valve (8) is disposed between the inlet and outlet channels, the stop valve sealingly closing the inner chamber when in the closed position, and the stop-valve when in the open position leaving the inner chamber free for the unhindered passage of the rotating piston. A supercharger (K) for supercharging fluid under a final compression pressure is disposed in the supercharging section (10) of the inner chamber (2) behind the rotating piston (3). A regulating valve (20) connected with the working stroke section (11) of the inner chamber (2) is capable of regulating the pressure of supercharging from the front side of the rotating piston (3).

1 Claim, 3 Drawing Sheets

SUPERCHARGED ROTARY PISTON ENGINE

This application is a continuation-in-part of my co-pending application Ser. No. 07/276,049 filed Jan. 4, 1989, abandoned.

FIELD OF ART

The invention relates to a rotary piston machine, primarily a supercharged rotary piston engine usable, for example, in automotive vehicles or as a sturdy motor or, respectively, as a compressor or as a pump.

STATE OF THE ART

As is known, inventors have tried for a long time to provide a volume-displacing internal combustion engine wherein a revolving motion takes place instead of the linear alternating piston motion. Under practical conditions, a number of such rotary piston machines or rotary piston engines have become known, but among these only the "Wankel motor" can be considered to be relatively popular. (See, for example, Dr. Abraham: "Traffic Manual", Technical Book Publishers, Budapest, 1978, pages 745-746.)

In the Wankel motor, the piston is actually a planetary gear with internal teeth, i.e. a ring gear. The outer contour of this gear ring is not circular but rather is a triangular design consisting of circular arcs and exhibiting the same diameter in any direction. When the crankshaft is rotated, the ring gear, i.e. the rotary piston, describes cycloid routes. The surface area thus "swept" by the rotary piston consequently has an almost epitrochoidal shape. If this basic surface is then encompassed by a jacket, the cylinder of the engine results in reality.

The above rotary engine is, it is true, of a much simpler structural design than the conventional reciprocating piston engine. Yet, in accordance with experience gained thus far, a serious obstacle to a more widespread usage of this engine resides in that the apex seal of the piston causes problems. Furthermore, the connection of cylinder and piston as well as the engine control is too complicated and too expensive in its structural design and therefore requires excessive expenditure in materials and a more sophisticated manufacturing technology.

DESCRIPTION OF THE INVENTION

The present invention pursues the objective of avoiding the above-mentioned deficiencies, i.e. of providing a rotary piston engine that is relatively less expensive and simpler in structural design and thus demands a relatively lesser expenditure while, on the other hand, ensuring widespread usage in the various areas of utilization.

In order to attain the thus-posed object, the starting point is a rotary engine comprising a cylinder equipped with an inlet port and an outlet port, as well as with a rotary piston rotatably installed in the inner chamber of the cylinder, the rotary piston furthermore being in driving connection with the main shaft of the motor. This invention was further developed by designing the inner chamber of the cylinder as a circular ring, the rotary piston being mounted coaxially with respect to the cylinder chamber but being arranged for rotation together with the main shaft. Furthermore, a stop valve is provided between the inlet port and the outlet port, this valve sealingly closing the cylinder chamber in the closed position but, in the open position, vacates in controlled fashion the cylinder chamber, for the unhindered passage of the rotary piston.

The rotary engine according to this invention can be utilized preferably as a supercharged rotary piston motor wherein the inlet port is equipped with a controlled intake valve and is connected with a unit (e.g. with a compressor) feeding the combustion air and/or a combustible gas mixture with compressed air. Furthermore, an intake supercharging sector, a working stroke sector and an exhaust sector are provided in the circular inner chamber of the working cylinder. In the intake supercharging sector, the cylinder is provided with a unit which can operate, in case of diesel engines, as a fuel injection nozzle, but in case of spark ignition engines as a spark plug.

The rotary piston is advantageously fashioned as a radial extension on a drive disk rotating in conformance with the main shaft. These form jointly the rotor of the engine.

According to a further feature of the invention, a design is also possible wherein the cylinder, in the working stroke sector, is additionally equipped with a second stop valve, a regulating valve for the supercharger pressure being located upstream of this valve as seen in the revolving direction of the rotary piston. Thereby, the supercharger pressure of the engine can be regulated within wide limits from the flushing side.

Another embodiment of the rotary piston engine according to this invention is also possible wherein a rotary engine, on the one hand, and a compressor, on the other hand, can be operated in a single cylinder. For this purpose, a third stop valve is arranged between the first stop valve and the outlet port of the rotary engine, and the cylinder is provided between the first and third stop valves with an air intake valve and an air exhaust valve. Furthermore, in this sector, the inner cylinder space forms a compressor in collaboration with the rotary piston.

It is also expedient to design the stop valve as a radially movably mounted slide. However, the stop valve can also be designed as a rotatable disk which is located normal to the revolving plane of the rotary piston, in the transverse direction thereto. This rotatable disk is at least provided with such an opening which is capable of allowing the rotary piston to pass through. Furthermore, the disk is connected with a revolving drive mechanism controlled in dependence on the rotation of the rotary piston.

BRIEF DESCRIPTION OF THE DRAWINGS

The invention will now be described in greater detail with reference to the appended drawings. The latter show three embodiments of a supercharged rotary piston engine in accordance with the invention, as follows.

PREFERRED EMBODIMENTS

Figure 1:
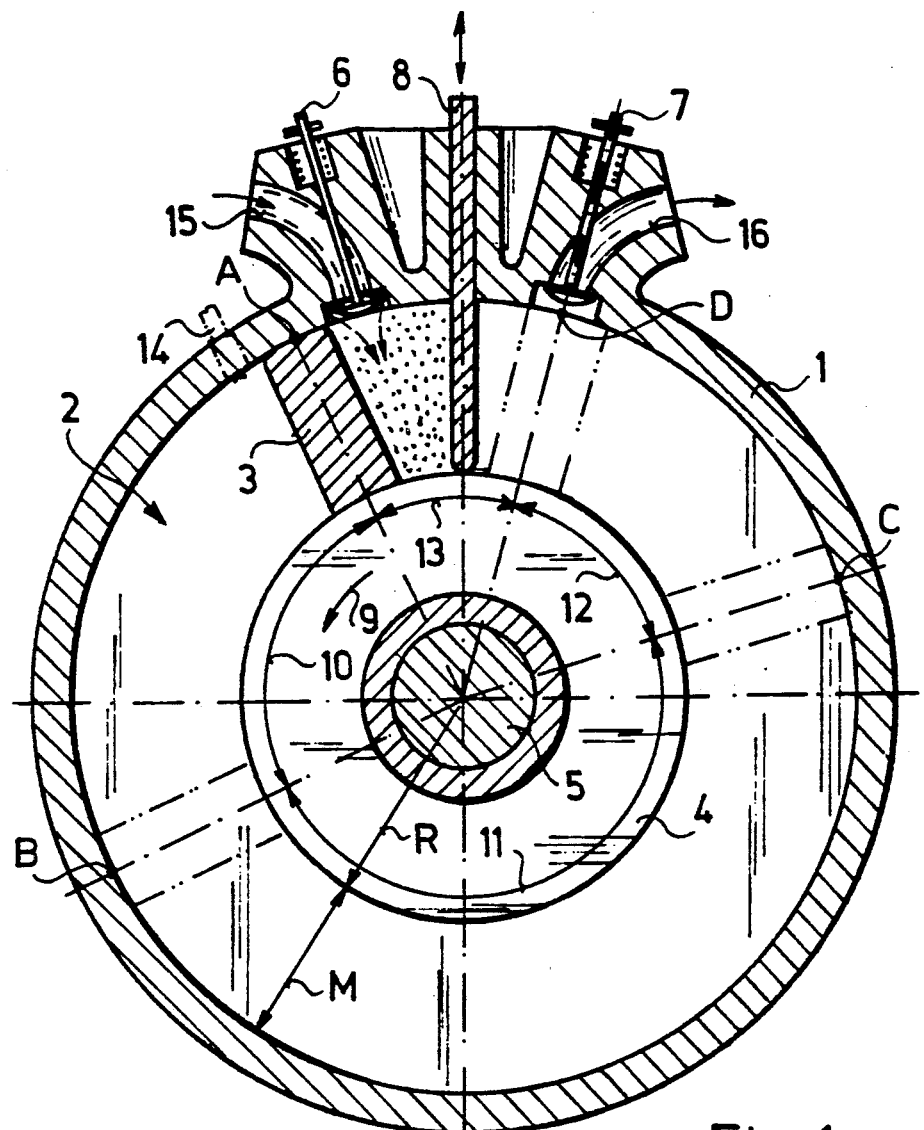
FIG. 1 shows a sectional view of the first embodiment of the rotary piston engine of this invention.

In the supercharged rotary piston engine illustrated in FIG. 1, a circular-ring-shaped inner chamber 2 is formed in a cylinder 1, a rotary piston 3 being rotatable in a sealing fashion within this chamber. The rotary piston 3 is attached, in the illustrated case, as a radial extension of square-prismatic cross section to a drive disk 4 which latter is arranged so that it rotates together with a coaxially supported main shaft 5 of the motor. The main shaft 5 is arranged in a motor housing in a manner known per se and connected by way of a shaft coupling with a drive mechanism of a vehicle (not shown).

The cylinder 1 is provided with an intake valve 6 and a discharge valve 7 serving for the opening and, respectively, closing of the inlet port 15 and, respectively, outlet port 16. According to the invention a stop valve 8 is installed additionally between the inlet port 15 and the outlet port 16, this stop valve, in the closed position, sealingly closing off the inner chamber 2 of the cylinder 1, but, in the opened position, vacating the entire cross section of the cylinder so that then the rotary piston 3 can freely pass through with its entire periphery.

In the present case, the stop valve 8 is designed as a slide that can be sealingly turned within a longitudinally oriented groove; from the closed position shown in FIG. 1, the slide is moved into the opened position by a control mechanism, not illustrated. This mechanism can be, for example, a regulating device cooperating with a control surface of the main shaft 5.

The rotary engine is, in this case, a supercharged motor (compressor motor), filling, via the intake valve 6, the combustion chamber under pressure with combustion air in case of diesel-type operation, or with a combustible gas mixture in case of gasoline engine operation, in such a way that the final pressure value for the compression is attained in the predetermined angular position of the rotary piston 3. By spontaneous ignition of the diesel oil (in case of diesel operation) injected at this point in time, or by spark ignition of the combustible gasoline-air mixture (in case of spark-ignition engines), the said fuels are then combusted. The thus-released energy turns the rotary piston 3, together with the main shaft 5, in the desired direction of rotation of arrow 9.

In the present instance, the annular inner chamber 2 of the cylinder 1 permits full revolution of the rotary piston 3 by 360°. Reference symbol "A" in FIG. 1 denotes the basic position of the rotary piston 3 at the beginning of supercharging, while "B" denotes the position of rotary piston 3 assumed by the latter at the instant of explosion. Accordingly, an arc section between "A" and "B" represents the supercharging sector 10 of the inner chamber 2. Furthermore, reference symbol "C" designates the rotary piston position at the end of the working stroke. An arcuate working stroke sector 11 extends between positions "B" and "C". Finally, "D" denotes the position of the rotary piston 3 at the end of the exhaust stroke, i.e. an exhaust sector 12 of the inner chamber 2 is located between positions "C" and "D", while the transitional sector 13 lies between positions "D" and "A".

In our experiments, the radius "R" of the drive disk 4 was chosen to be 100 mm, while its height "M" was selected to be 50 mm; furthermore, in the embodiment of FIG. 1, the supercharging sector 10 of the inner chamber 2 was chosen to be 90°, the working stroke sector 11 was 180°, the exhaust sector 12 was 60°, while the transitional sector 13 was selected to be 30°.

The cylinder 1 is provided, in the supercharging sector 10, with a unit 14 which conventionally is a fuel injection nozzle in case of diesel-type operation, while it is an electric spark plug in case of gasoline engine type operation.

Figure 2:
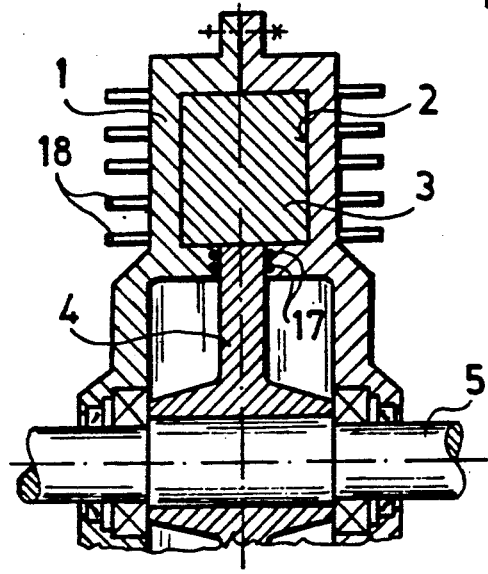
FIG. 2 is a cross section of the solution according to FIG. 1 on a relatively small scale.

FIG. 2 shows clearly in cross section that the cylinder 1 and the engine block integral therewith are of a divided design in the present case; furthermore, it is shown that the bottom seal of the rotary piston 3 is conventionally constituted by sealing rings 17 in contact on both sides with the end faces of the drive disk 4. If necessary, the cylinder 1 can be provided with cooling fins 18 along its outer jacket.

The supercharged rotary piston internal combustion engine according to FIG. 1 operates as follows:

In position "A" of the rotary piston 3, the intake valve 6 is opened whereas the stop valve 8 is found in the closed position. By way of the inlet port 15, for example for diesel operation, compressed air is then forced into the supercharging sector 10 of the inner chamber 2 until the rotary piston 3 enters position "B" when the intake valve 6 is closed. The external compression of the air is selected so that upon reaching position "B" of the rotary piston 3, the compressed air pressure has reached the planned final compression value and the temperature corresponding thereto. Thereupon, the fuel oil injected by unit 14 (in this case: through the injection nozzle) into the chamber 2 is combusted by self-ignition. It is to be noted that, during operation in the supercharging sector 10, the cylinder volume between the rearward end face of the rotary piston 3 and the stop valve 8 becomes increasingly larger. In spite thereof, with an increase in external compression, the required operating pressure and the temperature for the combustion must be ensured. Thus, the mode of operation according to this invention deviates in this feature from the thermodynamic diesel cycle process that is to be considered as classical. By regulation of the supercharging, the specific output of the engine can be regulated within wide limits.

The expansion effected by combustion turns the rotary piston 3 in the direction of arrow 9. During this step, the rotary piston 3 still undergoes the respective continued movements in the working stroke sector 11. The exhaust sector 12 is calculated in the present case from the position "C" of the rotary piston 3 whereas, with the discharge valve 7 being in the open position, the gases present in front of the rotary piston 3 in chamber 2 are pushed out of the cylinder chamber via the outlet port 16. It is to be noted that optionally the discharge valve 7 can be omitted.

The exhaust stroke is terminated once the rotary piston 3 enters position "D", and thereafter follows the transitional sector 13; after the rotary piston 3 has passed this sector, it reenters its initial position "A" and the above rotary process is cyclically repeated. Optionally, the intake valve 6 can be opened somewhat even before position "A" of the rotary piston 3 has been reached.

The internal combustion engine of this invention operates essentially similarly also when utilized in a spark ignition engine mode. There is merely a difference insofar as a gasoline-air mixture of previously determined pressure is conducted by means of a conventional mixture-forming device (e.g. a carburetor) via the inlet port 15 into the inner chamber 2 of the cylinder 1. Furthermore, in this case, the unit 14 will be an electric spark plug. The intake valve 6 permits the mixture (compressed to the final compression pressure with external compression and thereby heated to the prescribed extent) to enter the inner chamber 2 of the cylinder 1 through the inlet port 15. This external compression, i.e. supercharging of the cylinder chamber to the combustion pressure, can take place with any conventional compressor (e.g. a Roots-type compressor) so that additional details can be dispensed with. The supercharging pressure is in each case dependent on the selected method of operation and the type of fuel.

A distinguishing feature of the rotary piston engine according to this invention furthermore resides in that the supercharging sector 10 in the circular-ring-shaped inner chamber 2 of cylinder 1 can be lengthened or shortened arbitrarily. Thereby, depending on the respective power requirement, the size of the combustion chamber in an engine can be varied within wide limits. This means, in other words, that the volume of the combustion chamber of an engine of an already chosen size can be changed within wide ranges and for this purpose it is merely necessary to offset the beginning of position "B" of the rotary piston 3 along the circumference and, of course, also the regulation of the valves has to be changed correspondingly.

Figure 3:
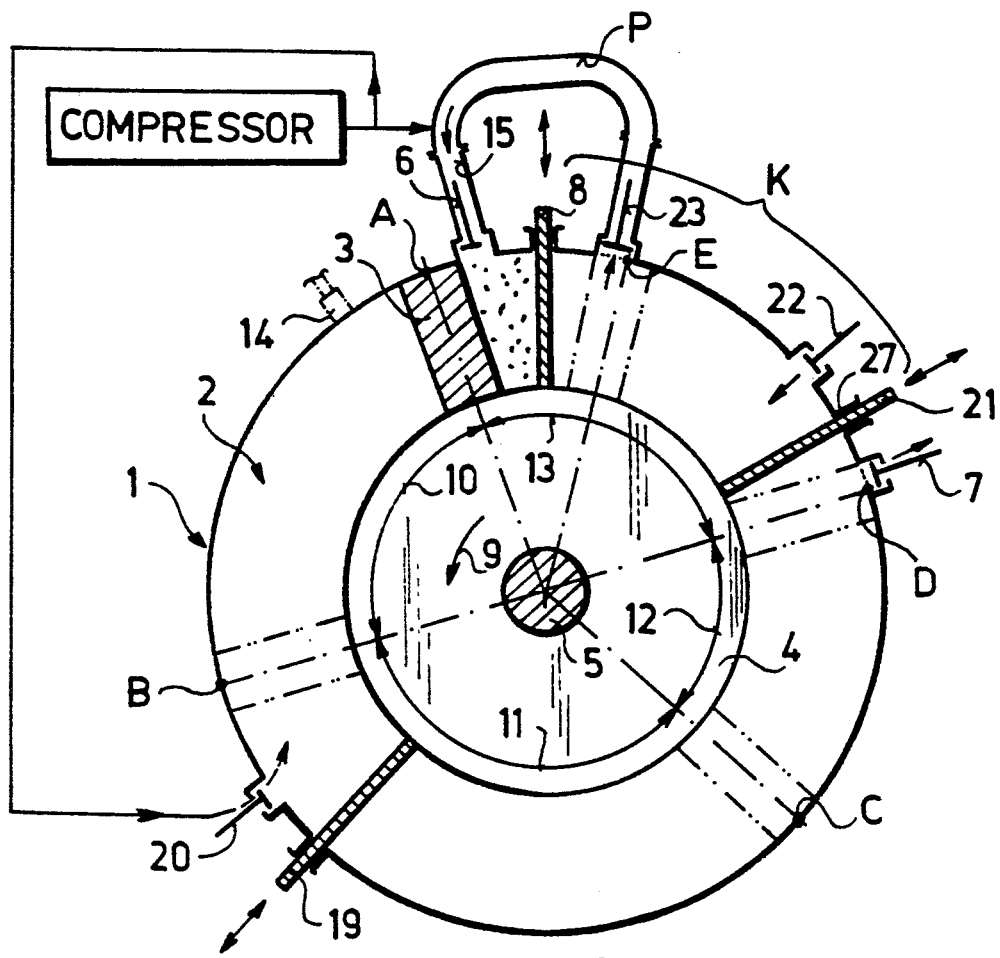
FIG. 3 shows a second embodiment of the rotary piston engine according to this invention, in a sectional view.

FIG. 3 illustrates a combined embodiment of the invention wherein the rotary piston engine is combined with a compressor.

This arrangement is in conformance with the embodiment of FIG. 1 and FIG. 2 with respect to the basic design of the internal combustion engine. Here again, the intake valve 6 is provided, as well as the discharge valve 7 and the stop valve 8 mounted between the two other valves. The supercharging sector 10 is here chosen to be 90°, the working stroke sector 11 to be 120°, the exhaust sector 12 to be 60°, while the transitional sector 13 is selected to be 90°.

In the working stroke sector 11, the cylinder 1 is provided with a further stop valve 19 which can be designed identically and controlled similarly to the stop valve 8. However, upstream of this further stop valve (as seen in the rotating direction of rotary piston 3), the cylinder 1 is equipped with a regulating valve 20, by means of which the supercharging pressure can be advantageously regulated by the cylinder chamber in front of the rotary piston 3 with respect to the direction of rotation. This can be advantageous, in particular, if the supercharging pressure can be regulated via the intake valve 6 by the compressor only within narrow limits. The stop valve 19 is to be opened when piston 3 has reached its predetermined position "B". Between the positions "A" and "B" of the piston 3 the stop valve 19 is closed.

Downstream of the discharge valve 7, the cylinder 1 is provided with a third stop valve 21. The latter can be identical, in the present case, to the stop valve 8 with respect to the structural design and the regulation.

In the transitional sector 13 a part of the cylinder chamber defined by the stop valves 21 and 8 operates—in collaboration with the rotary piston 3 as compressor "K", for which purpose the cylinder 1 is additionally equipped with an intake valve 22 and a discharge valve 23. This internal compressor "K" can in some cases also be actually sufficient for producing the supercharging pressure of the rotary piston engine via a pipe "P" connecting the inlet port 15 of the rotary engine with the outlet of the compressor "K". The compressor "K" can furthermore pass on the compressed air, for example, into a pressure reservoir (not shown) or to other purposes. In this case, the transitional sector 13 can be e.g. 180°, as well as the pipe "P" can be a gas reservoir too.

By way of the regulating valve 20, compressed air having been introduced in front of the rotary piston 3 with respect to the direction of rotation can be employed for regulating the supercharging pressure in the supercharging sector 10, which is to say that a given supercharging pressure in sector 10 can be reached at different positions "B" of the rotary piston 3 depending on the pressure that is built up on the leading side of the rotary piston 3 by introduction of compressed air through the valve 20. This compressed air can also simultaneously effectively cool the rotary piston 3 and the cylinder 1. Furthermore, the composition of the exhaust gas present in the cylinder chamber, i.e. the quality of the volatile motor gases ejected (exhaust gases) can also be improved thereby.

The transitional sector 13 mentioned in connection with the first embodiment is here traversed by the rotary piston 3 starting with &:he closing of the discharge valve 7 of the rotary engine up &:o the basic position "A", containing the compressor chamber between positions "D" and "E" of the piston 3.

Figure 4:
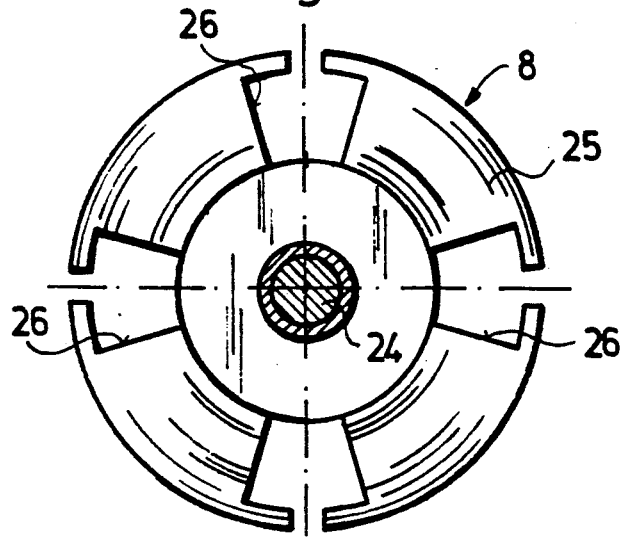
FIG. 4 shows a detail of the solution according to FIG. 3 as a preferred embodiment in a top view, partially in section.

In FIG. 4, an example is presented how the stop valves 8, 19 and 21 can be advantageously designed. As illustrated herein on a somewhat reduced scale, the stop valve can be fashioned as a disk 25 rotatable about a shaft 24 and provided, for permitting passage of the rotary piston 3, at least with one passage opening 26. The disk 25 engages the cylinder 1 radially and the plane of the annular inner chamber 2 in a normal fashion so that the disk can rotate in a groove 27 of the cylinder 1 in a sealing fashion about the shaft 24 mounted outside of the inner chamber. The shaft 24 is connected to a rotary drive mechanism (not shown), preferably with a conventional impulse drive mechanism which, depending on the respective position of the rotary piston 3, turns the disk 25 either into such a position that it can freely allow the rotary piston 3 to move from there via the passage opening 26, or the disk 25 is conveyed into such a position that its solid disk part seals the inner chamber 2 of the cylinder in a gastight fashion. With this embodiment, a noiseless and relatively simple operation and control of the step valves 8, 19, 21 can be obtained. Of course, the control must be such that the stop valves 8, 19, and 21 open and close in correspondence with the above-described mode of operation.

Figure 5:
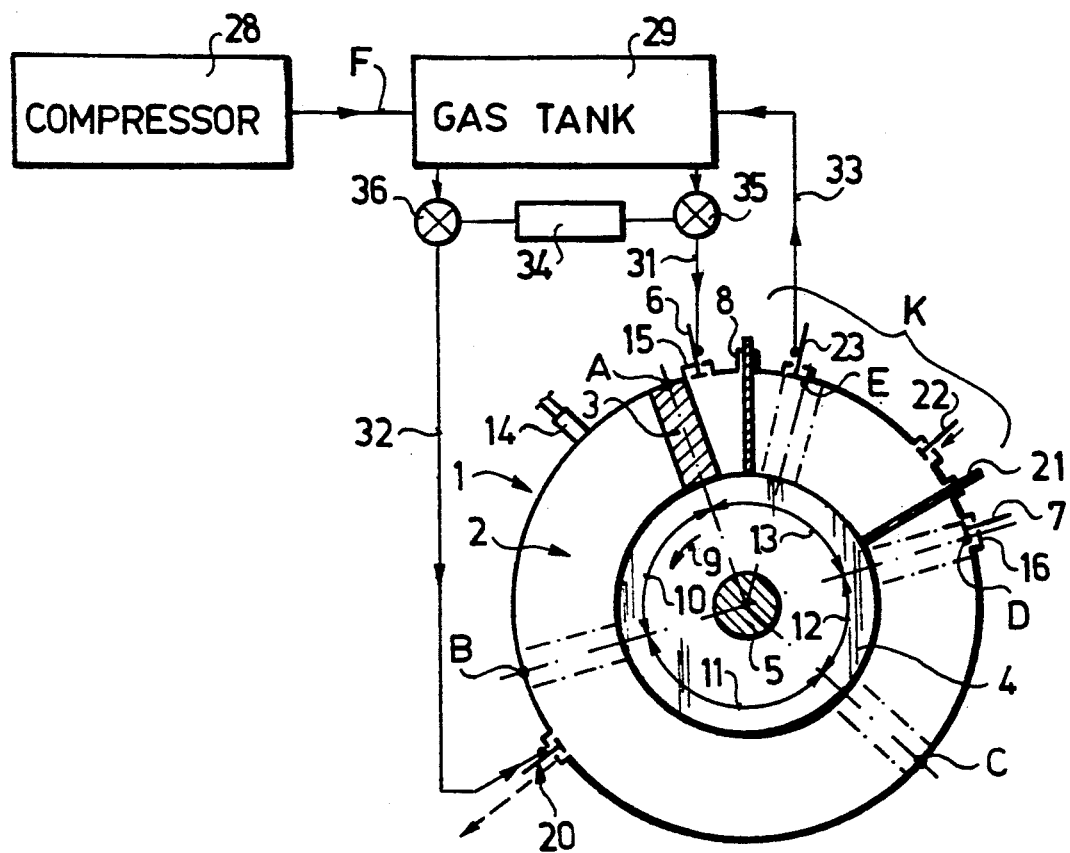
FIG. 5 shows a sectional view of a third embodiment of the rotary piston engine according to this invention.

FIG. 5 shows a preferred embodiment of the present invention, in which the supercharger means comprises at least one external compressor 28 continuously feeding compressed air via conduit "F" to a gas tank 29 which serves as a pressure accumulator, and from which in turn supercharging air is fed via conduit 31 to inlet port 15 and also via conduit 32 to port 20 which, in this instance serves as an inlet port. It is to be noted that port 20 can also serve as a discharge port when it is desired to reduce the pressure ahead of piston 3.

A further supply of compressed gas to the gas tank 29 is provided through a conduit 33 from the discharge valve 23 of the internal compressor "K" of the engine.

It will thus be seen that in this embodiment the external compressor 28 and/or the internal compressor "K" serve as a supercharging means for feeding fluid e.g. through the gas tank 29 to a final compression pressure in supercharging section 10 of inner chamber 2 behind the rotating piston 3 and for feeding fluid under pressure to regulating valve 20 connected with the working stroke section 11 of inner chamber 2 so as to apply pressure to the leading side of piston 3 in the direction of rotation of the piston thereby to control the position "B" of piston 3 when the final compression pressure is reached in supercharging section 10.

As a result of this possibility involving external and/or internal compressor(s), therefore, it is possible to regulate the position which piston 3 will have in chamber 2, at the time the desired ignition pressure is reached in supercharging section 10. Specifically, by applying greater pressure through 32, the piston 3 will be relatively closer to stop valve 8; and by applying less pressure through port 20, piston 3 will be farther from stop valve 8, that is, displaced counterclockwise as seen in FIG. 5 when it reaches ignition position "B". Accordingly, control means 34 is provided for adjusting valves 35 and 36 thereby selectively to control the pressures in conduits 31 and 32, respectively.

Although the above only contains several examples for use as internal combustion engines, the rotary piston machine according to this invention can optionally also be used advantageously as a pump or as a compressor. Furthermore, an arrangement is likewise possible wherein the stop valve or stop valves (e.g. against a compression spring) is or are opened by an end face of the rotary piston 3 designed as a control route.

One of the most important advantages of the solution according to this invention resides in that the rotor can be well balanced, whereby a quiet and vibration-free operation (running) of the machine can be achieved even in high speed ranges. Furthermore, it is also advantageous that the cylinder and the rotor are exceedingly simple with respect to their structural design and therefore can be built at relatively low expenditure. The crank drive mechanisms (crankshaft, connecting rods, etc.) heretofore absolutely essential in the conventional engines can here be omitted. Thus, the construction and operating safety of the rotary engine is still further simplified and, respectively, improved. Although it is: conceded that the generation of the intake pressure requires additional expenditure as compared with the presently utilized supercharged engines, this is counterbalanced by the fact that the operating parameters, namely the quality of the mixture, the supercharging final pressure, and the temperature can be more precisely controlled. However, as a consequence, it is possible to attain in the internal combustion engines a more complete combustion, a higher specific output, and a gas emission with less pollutants. Since the number of revolutions can be increased to any desired extent (even into a range above 10,000 rpm), the power of the internal combustion engine according to this invention can be significantly increased as compared with the conventional solutions. The internal combustion engine can be operated, besides using fuel oil and gasoline, also with any other combustible gaseous mixture. By the coaxial arrangement of the main shaft 5, the load on the main shaft bearings is substantially more favorable than in case of the conventional engines. Consequently, the internal combustion engine according to this invention is superior to the known spark ignition engine types also with respect to operating safety and service life.

Preferably the valves 19 and 20 are arranged at the beginning of the working stroke section 11 and as close as possible to each other (FIG. 3).

The gas tank 29 can be replaced in a given case by the conduits 31, 32, 33, depending on their length and volume, as well as the compressor chamber "K".

The valve 22 at the inlet port of the compressor "K" can be omitted. On the other hand, precompressed gases can also be introduced into the compressor "K".

It is to be noted that the supercharging means can have an extra compressor for feeding fluid to the regulating valve 20 (not shown).

What is claimed is:

1. A supercharged rotary piston engine, which comprises:
   a cylinder (1) with fluid conducting inlet and outlet channels (15, 16);
   an inner chamber (2) of said cylinder being ring-shaped;
   a main shaft (5) rotatably positioned in said cylinder;
   a rotary piston (3) in said inner chamber (2) mounted coaxially with said main shaft (5) and connected to and rotatable together with said main shaft (5) in one direction of rotation for the purpose of driving said shaft;
   a stop valve (8) disposed between said inlet and outlet channels, said stop valve sealingly closing the inner chamber when in the closed position, said stop valve when in the open position leaving the inner chamber free for the unhindered passage of said rotary piston;
   said inlet channel being ahead of said stop valve in said direction of rotation of the rotary piston;
   a regulating valve (20) connected with said inner chamber between said inlet channel and said outlet channel; and
   supercharging means (28) for feeding fluid under pressure to a final compression pressure in said inner chamber (2) through said inlet channel,
   said supercharging means also feeding fluid under pressure to said regulating valve when said rotating piston is between said inlet channel and said regulating valve.

* * * * *